United States Patent [19]

Furuta

[11] Patent Number: 4,962,435
[45] Date of Patent: Oct. 9, 1990

[54] DATA RECORDING/REPRODUCING APPARATUS AND METHOD FOR ACCURATELY PLAYING PROGRAM DATA AFTER DETECTING PROGRAM TOP SIGNAL

[75] Inventor: Yoshiki Furuta, Saitama, Japan

[73] Assignee: Pioneer Electronic Corporation, Tokyo, Japan

[21] Appl. No.: 445,167

[22] Filed: Dec. 6, 1989

Related U.S. Application Data

[63] Continuation of Ser. No. 193,461, May 13, 1988, abandoned.

[30] Foreign Application Priority Data

May 13, 1987 [JP] Japan .............................. 62-70107[U]
May 13, 1987 [JP] Japan .............................. 62-70108[U]

[51] Int. Cl.$^5$ ............................................. G11B 15/20
[52] U.S. Cl. .................................................. 360/72.2
[58] Field of Search ....................................... 360/72.2

[56] References Cited

U.S. PATENT DOCUMENTS 3,821,710 6/1974 Arciprete et al. ................. 360/72.2
4,421,954 12/1983 Mita et al. ......................... 360/72.2

Primary Examiner—Robert S. Tupper
Attorney, Agent, or Firm—Sughrue, Mion, Zinn, Macpeak & Seas

[57] ABSTRACT

A data recording method and apparatus for a magnetic recording medium, such as a magnetic tape for an R-DAT, in which the tops of the various music selections recorded on the tape are accurately detected so that reproduction can be started accurately. In one embodiment of the invention, program top detecting codes are recorded on the tape a predetermined time prior to the actual start of the music programs. In another embodiment, the program top detecting codes are recorded at the start of the respective programs. In the latter case, in a high speed search operation to find a desired music piece, when a corresponding program top code is detected, the commencement of reproducing the desired music piece is delayed for a predetermined period of time from the detection of the program top code, so that the reproduction is accurately carried out from the top of the desired music piece.

4 Claims, 3 Drawing Sheets

DATA RECORDING/REPRODUCING APPARATUS AND METHOD FOR ACCURATELY PLAYING PROGRAM DATA AFTER DETECTING PROGRAM TOP SIGNAL

This is a continuation of Ser. No. 193,461, filed 5/13/88, now abandoned.

BACKGROUND OF THE INVENTION

The present invention relates to data recording and reproducing apparatuses such as R-DATs (rotary head type digital audio tape recorders), 8-mm video tape recorders, and compact disk players. More particularly, the invention relates to a data recording and reproducing apparatus in which reproduction is carried out with the tops (start position) of programs to be reproduced detected with high accuracy.

For instance in an R-DAT, in addition to PCM audio signals, sub-code data for retrieving programs are recorded in different regions of the magnetic recording medium (such as a magnetic tape), and the sub-code data are read by a high-speed searching operation so that the tops of the programs can be detected quickly.

The sub-code data thus recorded for detection of the tops of programs are referred to as "program top detecting signals" or "start identification signals" (ST-ID). The start identification signal is an index signal for detecting a predetermined position on the magnetic tape. In general, the start identification signals are recorded for a predetermined period of time at the tops of pieces of music to facilitate the selection of the music program and reproduction operation.

Heretofore, in recording a plurality of pieces of music on a magnetic tape, the above-described start identification signals have been automatically recorded by, while the pieces of music are being recorded, the rise time of each of the pieces of music is detected, and simultaneously the start identification signal is recorded.

In the magnetic tape automatically recorded in the above-described manner, the start point of each of the pieces of music and the rise of its start identification signal are recorded simultaneously. Therefore, in the music selection and reproduction operation, the selected music is reproduced starting from the rise of the start identification signal. However, since a muting operation is effected for a certain period of time to squelch noise such as may be produced by various elements in the mechanical system, a part of the top portion of the music may not be reproduced.

This difficulty may be overcome by employing a method in which, with the muting time taken into account, after the detection of the rise of the start identification signal the magnetic tape is rewound for a certain period of time before the start of reproduction of the music. However, such a method is nevertheless disadvantageous in that the last part of the preceding piece of music may be reproduced.

SUMMARY OF THE INVENTION

An object, therefore, of the present invention is to eliminate the above-described difficulties accompanying a conventional data recording and reproducing apparatus of the above-described type. More specifically, an object of the invention is to provide a data recording and reproducing apparatus in which, upon detection of the rise of input program data, a program top detecting signal is recorded, and the input program data is recorded with a predetermined delay time from the recording of the program top detecting signal, whereby program data can be accurately reproduced after the program top has been detected in a program search operation.

The foregoing and other objects of the invention has been achieved by the provision of a data recording and reproducing apparatus in which a plurality of pieces of input program data and program top detecting signals indicating as sub-code data the tops of the input program data are recorded on a magnetic recording medium and reproduced therefrom, which, according to the invention includes a data recording system which comprises: a music top detecting circuit for detecting the start points of the input program data; a sub-code encoder for producing the program top detecting signals in response to a detection output of the music top detecting circuit; and a delay circuit for delaying the input program data for a predetermined period of time, and in which each of the program top detecting signals is recorded earlier than the respective program data, and in a music selection and reproduction operation, the program data is reproduced from the rise time of the program top detecting signal, whereby reproduction is achieved with the program top accurately detected.

Another object of the invention is to provide a data recording and reproducing apparatus in which, at the rise of the program top detecting signal detected in a high-speed search operation, an ordinary reproduction operation is carried out and the program data is reproduced with a predetermined delay time from the rise of the detected program top detecting signal.

The foregoing object of the invention has been achieved by the provision of a data recording and reproducing apparatus in which a plurality of pieces of program data and program top detecting signals indicating the tops of the program data are recorded on a magnetic recording medium and reproduced therefrom, in which, according to the invention, each of the program data is reproduced with a predetermined delay time from the rise of the respective program top detecting signal, and in a music selection and reproduction operation, the ordinary reproduction operation is started from the rise of the program top detecting signal, accordingly, reproduction is achieved with the program top accurately detected.

BRIEF DESCRIPTION OF THE INVENTION

DESCRIPTION OF THE PREFERRED EMBODIMENTS

Preferred embodiments of the invention will be described with reference to the accompanying drawings.

Figure 1:
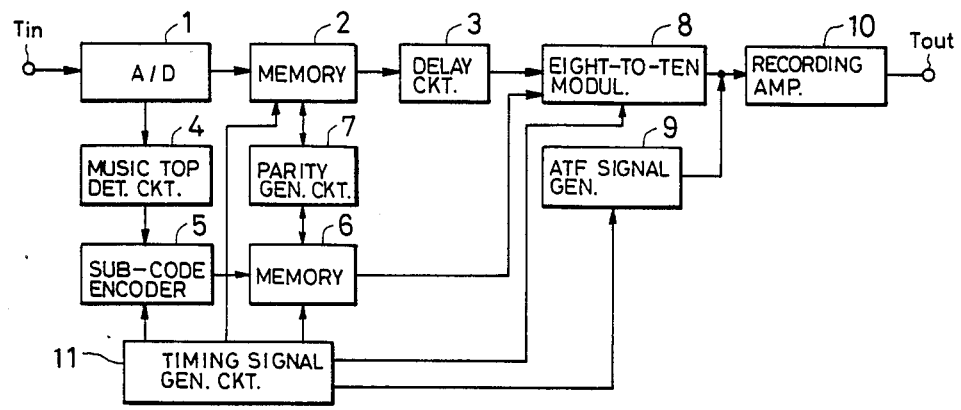
FIG. 1 is a block diagram showing the arrangement of a data recording system in a data recording and reproducing apparatus according to the invention applied to an R-DAT.

FIG. 1 is a block diagram showing a data recording system in an example of a data recording and reproducing apparatus constructed according to the invention, which is applied to an R-DAT.

In FIG. 1, reference numeral 1 designates an A/D (analog-to-digital) converter circuit for converting an input analog signal applied to an input terminal $T_{in}$ to a digital signal; 2, a memory for temporarily storing a digital signal outputted by the A/D converter circuit; 3, a delay circuit for delaying the output signal data of the memory 2 for a predetermined period of time; 4, a music top detecting circuit for detecting the top (start point) of a piece of music in an input signal received through the A/D converter circuit 1; and 5, a sub-code encoder for generating sub-code data, such as a start identification signal, in response to the output of the music top detecting circuit 4.

Further in FIG. 1, reference numeral 6 designates a memory for temporarily storing sub-code data outputted by the sub-code encoder 5; 7, a parity generator circuit outputting parity bits according to the content of data stored in the memory 6; and 8, an eight-to-ten circuit for performing modulation by converting the digital data delayed by the delay circuit 3 for the predetermined period of time, namely, music data and the sub-code data from the memory 6, into a data train including no d-c components.

Still further in FIG. 1, reference numeral 9 designates an ATF signal generator circuit for producing a tracking signal for controlling a tracking operation with high accuracy; 10, a recording amplifier which adds the ATF signal produced by the ATF signal generating circuit 9 to the output signal of the eight-to-ten modulator circuit 8 and amplifies the resultant signal to a level suitable for recording; and 11, a timing signal generating circuit for supplying timing signals to the memory 2, the sub-code encoder 5, the memory 6, the eight-to-ten modulator circuit 8, and the ATF signal generating circuit 9. The signal provided at an output terminal $T_{out}$ is supplied through a rotary transformer (not shown) to a rotary head unit with which it is recorded on a predetermined region of the magnetic tape.

The operation of the data recording system thus constructed will be described.

An input analog signal is supplied through the input terminal $T_{in}$ to the A/D converter circuit 1, where it is converted into a digital signal. The output digital data from the A/D converter circuit 1 is temporarily stored in the memory 2, where a parity bit supplied by the parity forming circuit 7 is included with the digital data. The digital data thus processed is applied to the delay circuit 3, where it is delayed for a predetermined period of time.

The delayed digital data is applied to the eight-to-ten modulator circuit 8, where it is added with the sub-code data from the memory 6 and converted into a data train including no d-c components. The data train from the eight-to-ten modulator circuit 8 is added to the ATF signal formed by the ATF signal generating circuit 9, and the resultant signal is applied to the recording amplifier 10, where it is amplified to a level suitable for recording. The output of the recording amplifier 10 is supplied to the output terminal $T_{out}$ and recorded on the magnetic tape.

The music top detecting circuit 4 detects a music start point out of the digital data outputted by the A/D converter circuit 1, and applies it, as music top data (indicating the music start point), to the sub-code encoder 5. In response to the music top data, the sub-code encoder 5 causes a start identification signal to be generated as sub-code data to the recorded at the top of the piece of music and supplies it to the memory 6.

In the memory 6, the sub-code data is combined with the parity bit provided by the parity forming circuit 7. The output data from the memory 6 is applied to the eight-to-ten modulator circuit 8. In the eight-to-ten modulator circuit 8, the data together with the music data delayed by the delay circuit 3 is converted into a data train including no d-c components. This data train, after being amplified by the recording amplifier 10, is recorded on the magnetic tape.

Figure 2:
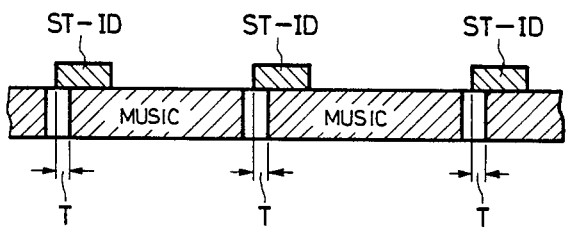
FIG. 2 is an explanatory diagram showing the recording of program data (music) and program top detecting signals (start identification signals) on a magnetic tape.

In the case where a plurality of pieces of music are successively recorded in the above-described manner, the start points of the various pieces of music, as shown in FIG. 2, are recorded on the magnetic tape with a delay time T determined by the delay circuit 3 from the rise points of the start identification signals ST-ID; that is, the start identification signals are recorded earlier by the time T than the music start points.

In the above-described data recording system, the music start points are recorded with a time delay from the rise of the start identification signals, as a result of which, during data reproduction, the music tops can be readily detected from the detection of the start identification signals.

Figure 3:
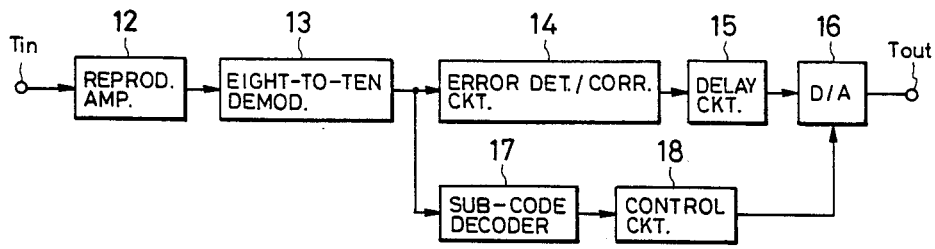
FIG. 3 is a block diagram showing the arrangement of a data reproducing system in a data recording and reproducing apparatus of the invention applied to an R-DAT.

However, if desired, in the recording operation, the start point of each piece of music and the rise time of the corresponding start identification signal are recorded at the same time, and reproducing is carried out with the music start point delayed from the rise of the start identification signal as shown in FIG. 3.

FIG. 3 is a block diagram showing the arrangement of an example of a data reproducing system in a data recording and reproducing apparatus constructed according to the invention as applied to an R-DAT. In this case, as described above, the reproducing operation is carried out with the music start point delayed from the rise of the start identification signal.

In FIG. 3, reference numeral 12 designates a reproduction amplifier for amplifying to a suitable level the reproduced signal read from the magnetic tape by the rotary head (not shown) and applied through a rotary transformer to an input terminal $T_{in}$; 13, an eight-to-ten demodulator circuit; 14, an error detecting and correcting circuit for detecting and correcting errors in data demodulated by the eight-to-ten demodulator circuit 13; 15, a delay circuit for delaying the output of the error detecting and correcting circuit 14 for a predetermined period of time; and 16, a D/A (digital-to-analog) converter circuit for converting the output digital signal of the delay circuit into an analog signal.

Further in FIG. 3, reference numeral 17 designates a sub-code decoder for extracting sub-code data from the demodulation output of the eight-to-ten demodulator circuit; and 18, a control circuit for controlling various mechanism (not shown) and muting the output of the D/A converter circuit 16.

In the data reproducing system thus constructed, the signal read from the magnetic tape by the rotary head is applied through the input terminal $T_{in}$ to the reproduction amplifier 12, where it is suitably amplified. The output of the reproduction amplifier 12 is applied to the eight-to-ten demodulator circuit, where it is subjected to demodulation. The demodulation output of the eight-to-ten demodulator circuit is applied to the error detecting and correcting circuit 14, where error data are corrected. The output of the circuit 14 is supplied to the delay circuit 15, where it is delayed for a predetermined time. The output of the delay circuit is applied to the D/A converter circuit 16, where it is converted into an analog signal, which is then applied to an output terminal $T_{out}$.

On the other hand, the demodulation output from the eight-to-ten demodulator circuit 13 is supplied to the sub-code decoder 17. The sub-code decoder 17 extracts sub-code data from the demodulation output and decodes the sub-code data. The output of the sub-code decoder 17 is applied to the control circuit 18. In response to the start identification signal included in the sub-code data, the control circuit 18 controls in association with the delay time of the delay circuit 15, the muting timing during search operations, for instance, in music selection and reproduction operations, thereby to control the muting condition of the D/A converter circuit 16.

Figure 4:
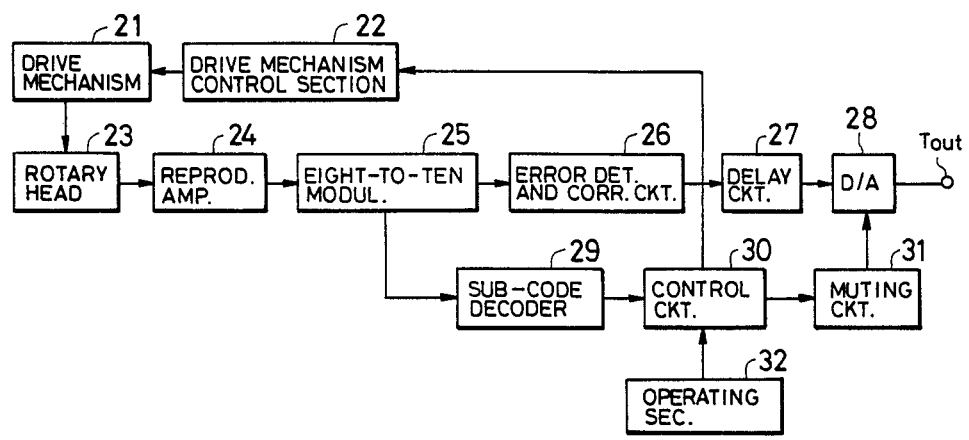
FIG. 4 is a block diagram showing the arrangement of a data recording system in a data recording and reproducing apparatus according to another embodiment of the invention applied to the R-DAT.

FIG. 4 is a block diagram showing a data reproducing system in another example of a data recording and reproducing apparatus according to the invention as applied to an R-DAT.

In FIG. 4, reference numeral 21 designates a mechanism for driving the magnetic tape; 22, a mechanism control section for controlling the operation of the driving mechanism 21; 23, a rotary head for reading signals from the magnetic tape; 24, a reproducing amplifier for processing the output signals from the rotary head 23; and 25, an eight-to-ten demodulator circuit for demodulating a data train.

Further in FIG. 4, reference numeral 26 designates an error detecting and correcting circuit for detecting errors from the output demodulation data of the eight-to-ten demodulator circuit 25; 27, a delay circuit for delaying for a predetermined period of time demodulation data processed by the error detecting and correcting circuit 26; 28, a D/A (digital-to-analog) converter circuit for converting the digital signal thus delayed into an analog signal.

Further in FIG. 4, reference numeral 29 designates a sub-code decoder for extracting only sub-code data from the data demodulated by the eight-to-ten demodulator circuit 25; and 30, a control circuit which, according to an instruction signal from an operating section 32 implemented with switches or sub-code data supplied by the sub-code decoder 29, applies an instruction signal to the mechanism control section 22 to control the mechanism 21 and the muting operation of a muting circuit 31. The muting circuit 31 is used to control the muting of the output of the D/A converter circuit 28.

The operation of the data reproducing system thus organized will be described.

Figure 5:
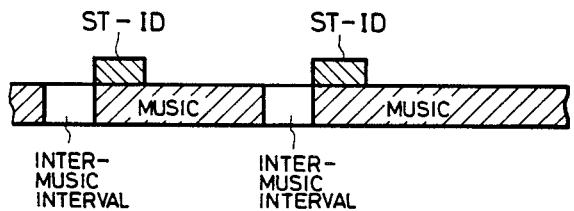
FIG. 5 is an explanatory diagram showing a magnetic tape on which start identification signals are recorded in a conventional manner.

FIG. 5 shows a magnetic tape on which, simultaneously when a piece of music starts (rises), a music top detecting signal which is sub-code data, namely, a start identification signal (ST-ID), is recorded.

A music selection and reproduction operation carried out by detecting the start identification signals is as follows:

When the operating section 32 is operated to start the start identification signal search operation, a search operation start instruction is supplied to the control circuit 30 by the operating section 32. As a result, the control circuit 30 applies an instruction signal to the mechanism control section 22 to start the search operation.

The mechanism control section 22 controls the mechanism 21 so that the magnetic tape is driven in a search direction instructed by the operating section 32, that is, in the FF (fast forward) direction or in the REW (rewinding) direction, at high speed. In this operation, the rotary head 23 reads the signals from the magnetic tape thus driven at high speed and applies them to the reproduction amplifier 24. The output signal of the reproduction amplifier is demodulated by the eight-to-ten demodulator circuit 25. The sub-code decoder 29 extracts the sub-code data from the demodulation output of the eight-to-ten demodulator circuit 25. In this operation, the start identification signal, which recorded as the music top detecting signal, is detected, a detection output indicating the detection of the start identification signal is supplied to the control circuit 30.

Upon reception of the start identification signal detection output from the sub-code decoder 29, the control circuit 30 drives the magnetic tape back and forth at a middle speed through the instruction loop (control circuit 30—driving mechanism control section 22—driving mechanism 21—rotary head 23—reproducing amplifier 24—eight-to-ten demodulator circuit 25—sub-code decoder 29—control circuit 30', similar to that in the above-described case, to correct the over-run caused by the high speed drive. That is, the control circuit 30 operates so that, after the start identification signal is detected with high accuracy, the search operation is accomplished and the driving mechanism 21 is placed in the ordinary reproduction state.

Figure 6:
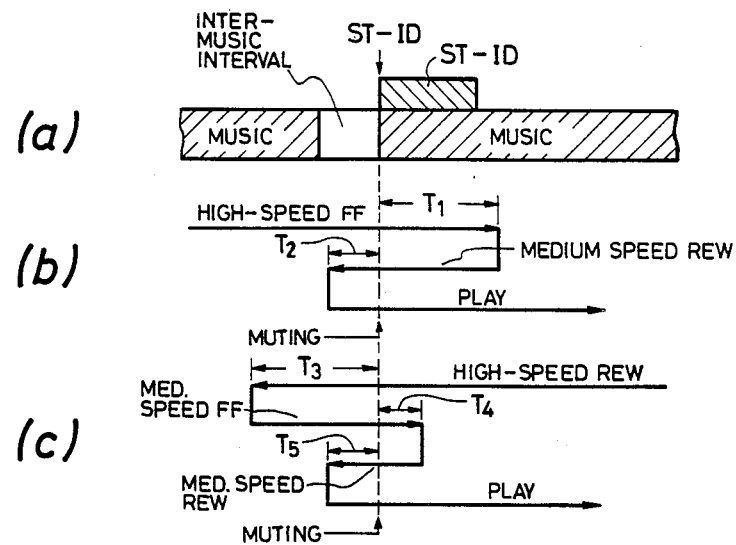
FIG. 6 is an explanatory diagram for a description of the operation of a driving mechanism in the apparatus of FIG. 4 during a high-speed search of the start identification signal.

The operation of the mechanism which, in the above-described music section and reproduction operation, is carried out from the time instant that the start identification signal is detected until the ordinary reproduction operation is effected is shown in FIG. 6 separately according to the "FF" direction search and the "REW" direction search.

FIG. 6 at (a) shows pieces of music (programs) and the start identification signal (program top detecting signal) recorded on the magnetic tape. In the case of the "FF" direction search, as shown at (b) in FIG. 6, first the high-speed search operation in the "FF" direction is carried out, and for a period of time $T_1$ from the detection of the start identification signal in the high-speed search operation, the magnetic tape is allowed to over-run. Then, a middle-speed search operation is carried out in the "REW" direction, and for a period of time $T_2$ from the detection of the same start identification signal, the magnetic tape is allowed to over-run. With muting in effect for the period of time $T_2$, ordinary reproduction operation is carried out. Muting is released at the rise of the start identification signal, and at the same time reproduction of the music (program) is started.

In the case of the "REW" direction search, as shown at (c) in FIG. 6, first the high-speed search operation in the "REW" direction is carried out, and for a period of time $T_3$ from the detection of the start identification signal in the high-speed search operation, the magnetic tape is allowed to over-run. Thereafter, a middle-speed search operation is carried out in the "FF" direction, and for a period of time $T_4$ from the detection of the same start identification signal in the middle-speed search operation, the magnetic tape is allowed to over-run. Subsequently, a middle-speed search operation is carried out in the "REW" direction, and for a period of time $T_5$ from the detection of the same start identification signal in the search operation, the magnetic tape is allowed to over-run. With the muting operation effected for the period of time $T_5$, ordinary reproduction is carried out. Muting is released at the rise of the start identification signal, and at the same time reproduction of the music is started.

As is apparent from the above description, during the search operation and for the predetermined period of time in the reproduction operation, the control circuit 30 mutes the output of the D/A converter circuit 28 with the aid of the muting circuit 31, and releases the muting operation at the detection of the rise of the start identification signal.

The demodulation output of the eight-to-ten demodulator circuit 30, after being subjected to error correction by the error detecting and correcting circuit 26, is delayed by a predetermined period of time by the delay circuit 27. The output of the delay circuit 27 is converted into an analog signal by the D/A converter circuit 28, which is applied, as a reproduction output, to the output terminal $T_{out}$.

Figure 7:
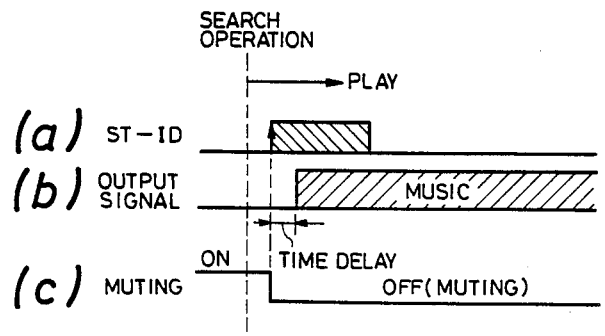
FIG. 7 is a block diagram showing relationships between a start identification signal, an output signal, and a muting operation in the apparatus of the invention.

FIG. 7 shows relationships between the start identification signal, the output signal and the muting operation. In the step of starting the reproduction of a selected piece of music after the search operation has been completed, at the rise of the start identification signal as shown in FIG. 7, muting is released, as shown at (c) in FIG. 7, and as shown at (b) in FIG. 7 the output signal appears a predetermined period of time after the rise of the start identification signal, whereupon the music is reproduced.

That is, after the search operation, the reproduction operation is started, and at the detection of the rise of the start identification signal, the muting operation is released and the reproduction signal is supplied to the output terminal $T_{out}$. In this connection, it is not always necessary that muting be released at the rise of the start identification signal. That is, the muting operation may be released after a period of time following the rise of the start identification signal which elapses from the rise of the start identification signal until the music starts.

As is apparent from the above description, in a data recording and reproducing apparatus in which a plurality of program data and program top detecting signals indicating the tops of the program data are recorded and reproduced, according to the invention, each of the program data is reproduced with a predetermined delay time from the respective program top detecting signal. As a result, when, in the music selection and reproduction operation, with the program top detecting signal detected by the high-speed search operation and reproduction is started at the rise of the program top detecting signal, there is a predetermined delay time between the rise of the program top detecting signal and the start point of the music, and therefore the release of the muting operation can be positively timed. Thus, the data recording and reproducing apparatus of the invention is free from the difficulties that because of fluctuations in over-run of the magnetic tape during the search operation the top part of a piece of music is not reproduced or the reproduction is started from the end part of the preceding piece of music. That is, the apparatus of the invention can reproduce the program data with program top detecting signals accurately detected.

As is apparent from the above description, in a data recording and reproducing apparatus in which input program data and program top detecting signals indicating the tops of the input program data are recorded and reproduced, according to the invention, the input program data are recorded and reproduced a predetermined delay time from the program top detecting signals. Therefore, even if, for instance in a music selection and reproduction operation, the reproduction operation is started at the rise of the program top detecting signals, since music delay timing is positively established, the muting release timing can be effected with ease, and the reproduction operation can be accurately achieved.

I claim:

1. A rotary head type digital audio tape recording and reproducing apparatus for a magnetic medium on which a plurality of pieces of input program data and program top detecting signals indicating, as sub-code data, the tops of said input program data are recorded, said apparatus including a data recording system comprising:
    a top detecting circuit for detecting the start points of said input program data;
    a sub-code encoder for generating said program top detecting signals according to outputs of said top detecting circuit; and
    a delay circuit for delaying said input program data for a non-zero predetermined period of time so that each of said program top detecting signals is recorded earlier than respective program data, whereby in a data selection and reproduction operation in which said program data is reproduced from a rise of said program top detecting signal, reproduction is accurately achieved from the respective program top.

2. A rotary head type digital audio tape recording and reproducing apparatus for a magnetic medium on which a plurality of pieces of input program data and program top detecting signals indicating, as sub-code data, the tops of said input program data are recorded, said apparatus including a data reproducing system comprising:
    means for receiving recorded program data and for demodulating the received recorded data, said means outputting a demodulation signal;
    a sub-code decoder for extracting said program top detecting signals from the demodulation signal; and
    a delay circuit for delaying each of said program data demodulated for a non-zero predetermined period of time from the rise of the respective program top detecting signal, and in a data selection and reproduction operation, reproduction of each of said program data is delayed the predetermined period of time from the rise of the respective program top detecting signal.

3. A method for recording and reproducing data on a magnetic recording medium in a rotary head type digital audio tape recording and reproducing apparatus, comprising the steps of:
    for recording, recording program top detecting signals on said recording medium a non-zero predetermined time prior to the start of each of a plurality of data pieces recorded on said medium, the program top detecting signals being recorded on said recording medium upon detection of respective data signals representing data pieces to be recorded, the top detecting signals being recorded on said recording medium the predetermined time prior to the start of the recorded data pieces by delaying the recording of the data pieces by the predetermined time after detection of the start of the respective data pieces to be recorded;

for reproduction, searching for a recorded desired data piece by detecting said program top detecting signals, and commencing playing of said desired data piece immediately upon detection of a respective program top detecting signal.

4. A method for reproducing a magnetic medium in a rotary head type digital audio tape recording and reproducing apparatus, the magnetic medium having recorded thereon a plurality of data pieces and respective program top detecting signals, said respective top detecting signals being recorded on said magnetic medium at each of said data pieces, comprising the steps of:

searching for a desired data piece by moving said magnetic medium at a high speed and detecting said program top detecting signals;

muting, during searching for the desired data piece, output signals from said medium;

when a program top detecting signal corresponding to said desired data piece is detected, releasing the muting of output signals from said medium, delaying the commencement of reproducing said desired data piece for a non-zero predetermined period of time from the detection of the program top detecting signal, and commencing the reproduction of said desired data piece.

* * * * *